(12) United States Patent
Morisawa

(10) Patent No.: US 8,446,287 B2
(45) Date of Patent: May 21, 2013

(54) LOOSE PART MONITORING METHOD AND SYSTEM

(75) Inventor: Toshizumi Morisawa, Takamatsu (JP)

(73) Assignee: Shikoku Research Institute Incorporated (JP)

( * ) Notice: Subject to any disclaimer, the term of this patent is extended or adjusted under 35 U.S.C. 154(b) by 896 days.

(21) Appl. No.: 12/769,242

(22) Filed: Apr. 28, 2010

(65) Prior Publication Data

US 2010/0321195 A1    Dec. 23, 2010

Related U.S. Application Data

(63) Continuation-in-part of application No. PCT/JP2007/071320, filed on Nov. 1, 2007.

(51) Int. Cl.
*G08B 21/00*    (2006.01)

(52) U.S. Cl.
USPC ............. 340/683; 340/679; 376/245; 73/570; 73/592; 367/125

(58) Field of Classification Search
USPC .................. 340/679, 683, 500, 511; 376/216, 376/245–246, 249, 252; 73/570, 572, 592, 73/645–648; 367/127, 125, 112
See application file for complete search history.

(56) References Cited

U.S. PATENT DOCUMENTS

| | | | | |
|---|---|---|---|---|
| 4,352,167 A | * | 9/1982 | Hashimoto et al. | ........... 367/127 |
| 4,392,214 A | * | 7/1983 | Marini et al. | ................. 367/127 |
| 4,586,378 A | * | 5/1986 | Izumi et al. | ..................... 73/572 |
| 4,605,924 A | * | 8/1986 | Marini et al. | ................. 340/683 |
| 4,641,526 A | * | 2/1987 | Izumi et al. | ..................... 73/572 |
| 4,747,309 A | * | 5/1988 | Weir | ............................... 73/655 |
| 5,333,501 A | * | 8/1994 | Okada et al. | .................... 73/592 |
| 5,444,443 A | * | 8/1995 | Umeda et al. | ................. 340/933 |

FOREIGN PATENT DOCUMENTS

| | | |
|---|---|---|
| JP | 56-021021 | 2/1981 |
| JP | 57-060230 | 4/1982 |
| JP | 60-27329 | 2/1985 |
| JP | 62-104196 | 7/1987 |
| JP | 63-165799 | 7/1988 |
| JP | 64-015696 | 1/1989 |
| JP | 01-214797 | 8/1989 |
| JP | 01-321397 | 12/1989 |
| JP | 05-126980 | 5/1993 |

* cited by examiner

*Primary Examiner* — Mohammad Ghayour
*Assistant Examiner* — Nay Tun
(74) *Attorney, Agent, or Firm* — Bacon & Thomas, PLLC

(57) ABSTRACT

A loose part monitoring method and system for preventing the generation of a false alarm as much as possible, including analyzing a group of detection signals that have been output from a plurality of sensors placed on a wall defining a fluid flow path, wherein the group of detection signals are analyzed for a rising gradient that is related to change in intensity of impulsive sound, a damping time that is related to change of intensity of the impulsive sound, and a frequency spectrum that is related to pitch of the impulsive sound in order to determine whether the group of detection signals are false or true.

17 Claims, 7 Drawing Sheets

LOOSE PART MONITORING METHOD AND SYSTEM

CROSS-REFERENCE TO RELATED APPLICATION

This application is a continuation-in-part of International Patent Application PCT/JP2007/071320, filed Nov. 1, 2007, the contents of the above PCT application being hereby incorporated by reference herein in its entirety.

BACKGROUND OF THE INVENTION

1. Field of the Invention

The invention of this application relates to a loose part monitoring method and system for monitoring a loose part in a fluid flow path of a plant facility such as a nuclear installation.

2. Description of Prior Art

One method for monitoring a loose part in a fluid flow path includes: providing a plurality of sensors on a wall of a fluid flow path; analyzing vibration signals detected by the sensors; and generating a predetermined alarm warning that a loose part is present when it is determined that the detected vibration signals are derived from an impact of a loose part.

The accuracy of such an alarm largely depends on whether the detection signals from the sensors are true or false as information to determine the presence of a loose part, in other words, on whether the detection signals are derived from an impact of a loose part or from background noise such as sound of a swirling stream. Therefore, prevention of false alarm to ensure the accuracy of the alarm resides in improving the accuracy of detection signals from the sensors based on which an alarm is generated, in other words, in how false signals derived from background noise can be excluded from the detection signals.

Based on this perspective, various proposals have been made to improve the accuracy of detection signals from sensors (for example, see Japanese Published Unexamined Patent Publication No. JP-A-H01-015696 (Patent Document 1), Japanese Published Unexamined Patent Publication No. JP-A-H01-321397 (Patent Document 2) and Japanese Published Unexamined Patent Publication No. JP-A-H01-214797 (Patent Document 3).

A loose part monitoring system described in Patent Document 1, which focuses particularly on false signals derived from thermal expansion among false signals that may lead to a false alarm and is intended to improve the accuracy of the alarm by excluding the false signals, has a right/wrong determining section and a frequency analyzing section as means for determining whether the detection signals are true or false. The right/wrong determining section "determines, when three alarm signals are received within 0.5 ms, that the detection signals are false signals," and the frequency analyzing section determines that signals that are generated at long intervals and have low energy are false signals derived from thermal expansion. Then, the false signals are excluded from the subsequent monitoring control.

A loose part monitoring system described in Patent Document 2, which focuses particularly on false signals derived from background noise during start-up and so on among false signals that may lead to a false alarm and is intended to improve the accuracy of the alarm by excluding the false signals, has a right/wrong determining section having a configuration similar to that of the right/wrong determining section described in Patent Document 1 as means for determining whether the detection signals are true or false.

A loose part monitoring system described in Patent Document 3, which focuses particularly on false signals derived from electrical noise and background noise among false signals that may lead to a false alarm and is intended to improve the accuracy of the alarm by excluding the false signals, has a right/wrong determining section having a configuration similar to that of the right/wrong determining section described in Patent Document 1 as means for determining whether the detection signals are true or false.

The loose part monitoring systems described in the Patent Documents 1 to 3 listed above has a right/wrong determining section to discriminate false signals derived from thermal expansion (in the case of Patent Document 1), to discriminate false signals derived from background noise during start-up and so on (in the case of Patent Document 2) and to discriminate false signals derived from electrical noise and background noise (in the case of Patent Document 3) among detection signals from the sensors, and the right/wrong determining section "determines, when three alarm signals are received within 0.5 ms, that the detection signals are false signals." When such a determination method is adopted, however, there is a possibility that "signals derived from an impact of a loose part" that should be acquired in view of the purpose to monitor a loose part are determined as false signals and excluded erroneously.

Since sound (vibration) travels through steel at a speed of "3 m/ms," the above "within 0.5 ms" is equivalent to "within 1.5 m" in terms of distance.

Here, a reactor vessel, in general, has four sensors arranged generally symmetrically on a peripheral wall thereof, and therefore the two diagonal lines connecting pairs of sensors opposed to each other with respect to the center of the vessel cross generally at the center of the vessel. Thus, when an impact is generated in a circular area with a diameter of "1.5 m" around the intersection of the two diagonal lines (i.e., the center of the vessel) (which is hereinafter referred to as "particular area"), the sensors theoretically detect signals derived from the impact within a time difference of "0.5 ms".

Therefore, when it is determined, when three alarm signals are received within 0.5 ms, that the detection signals are false signals as described above, the signals derived from an impact generated by a loose part in the above particular area are erroneously excluded as false signals.

The loose part monitoring system described in Patent Document 1 has a frequency analyzing section in addition to the right/wrong determining section, and the frequency analyzing section determines signals that are generated at long intervals and have low energy as false signals derived from thermal expansion and excludes the signals. The determination method is based on the assumption that abnormal sounds due to an impact of a loose part "are generated at short intervals and have high energy." Therefore, minor signals that are generated at long intervals and have low energy are excluded as false signals even if they are signals derived from an impact of a loose part.

As described above, the loose part monitoring systems described in the Patent Documents 1 to 3 described above may make a wrong determination about whether the detection signals are true or false, and there is still room for improvement in the reduction of a false alarm.

It is believed that a major reason why the loose part monitoring systems according to Patent Documents 1 to 3 described above may make a wrong determination about whether the detection signals are true or false is that the discrimination between right and false signals, i.e., between impulsive sound (vibration) derived from an impact of a loose part and impulsive sound (vibration) derived from noise, is made based on a secondary or derivative physical phenomenon associated with the occurrence of an impact such as the correlation between the distance between the impact location and sensors and the sound propagation speed or the difference in interval and frequency at which impacts are generated.

SUMMARY OF THE INVENTION

Therefore, the invention of this application has been made to provide a loose part monitoring method and a loose part monitoring system which use the tone of impulsive sound as information for use in determining whether the detection signals from sensors are true or false in order to improve, the accuracy of the determination, to prevent the generation of a false alarm and to improve the reliability of alarm.

Since impulsive sound has a peculiar tone depending on its cause (in other words, different causes create different qualities of sound), the tone of impulsive sound derived from an impact of a loose part and the tone of impulsive sound derived from noise other than an impact of a loose part, for example, can be clearly discriminated by comparing them. In addition, the tone of impulsive sound is specified in terms of frequency distribution (i.e., pitch), change in intensity, and loudness (i.e., sound pressure).

Thus, in a broad aspect, the present invention provides a loose part monitoring method for preventing the generation of a false alarm, including analyzing a group of detection signals that have been output from a plurality of sensors, wherein the group of detection signals are analyzed for a rising gradient that is related to change in intensity of impulsive sound, a damping time that is related to change in intensity of the impulsive sound, and a frequency spectrum that is related to pitch of the impulsive sound in order to determine whether the group of detection signals are false or true.

In accordance with one specific aspect of the invention there is provided a method for monitoring a loose part in a fluid flow path using a plurality of sensors which are placed in predetermined positions on a wall defining the fluid flow path for detecting information on sound or vibration, said plurality of sensors being configured to output a group of detection signals upon detection of the information, said method comprising:

a first false signal determination step comprising comparing a pattern of the order and difference in time of output of the group of detection signals from the plurality of sensors with reference patterns to determine whether or not the group of signals are false signals;

a second false signal determination step comprising comparing a rising gradient of one detection signal which is selected from the group of detection signals and which has been output early with that of another detection signal which is selected from the group of detection signals and which has been output late to determine whether or not the group of signals are false signals;

a third false signal determination step comprising obtaining a damping time of the waveform of one detection signal which is selected from the group of detection signals and determining whether or not the selected detection signal is derived from an impact and thereby determining whether or not the group of signals are false signals;

a fourth false signal determination step comprising comparing the frequency spectra of the group of detection signals to determine whether or not the group of signals are false signals; and a fifth false signal determination step comprising comparing the rising gradients, damping times, and frequency spectra of the group of detection signals obtained in the second to fourth false signal determination steps with those of known detection signals determined as false signals in the past, and determining whether or not there are any detection signals in the group of detection signals that have the same properties as the known detection signals, thereby to determine whether or not the group of signals are false signals.

In a second specific aspect of the present invention there is provided a method for monitoring a loose part in a fluid flow path defined by a wall member using a plurality of sensors which are placed in predetermined positions on the wall member and which are configured to output detection signals upon detecting information on sound or vibration, comprising:

a first false signal determination step comprising receiving the detection signals from the plurality of sensors, acquiring a pattern of the order in which selected two of the detection signals have been output and the difference in time of output between the selected two detection signals, and comparing the acquired pattern with reference pattern records to determine whether or not the detection signals are false signals;

a second false signal determination step comprising receiving the detection signals from the plurality of sensors, acquiring a first rising gradient of first one of the detection signals, acquiring a second rising gradient of second one of the detection signals that arrives later than the first one, and comparing the first and second rising gradients to determine whether or not the detection signals are false signals;

a third false signal determination step comprising receiving the detection signals from the plurality of sensors, obtaining a damping time of selected one of the detection signals, and determining whether or not the obtained damping time falls within a predetermined range and thereby to determine whether or not the detection signals are false signals; and a fourth false signal determination step comprising receiving the detection signals from the plurality of sensors, obtaining frequency spectra of at least two of the detection signals, and determining whether or not the obtained frequency spectra of the at least two detection signals match with each other and thereby to determine whether or not the detection signals are false signals.

In a third aspect of the present invention, the method according to the above second aspect may further comprises a fifth false signal determination step comprising comparing the rising gradients, damping times, and frequency spectra of the detection signals obtained in the second to fourth false signal determination steps with those of detection signals determined as false signals in the past to determine whether or not the detection signals are false signals.

In a fourth aspect of the present invention, the method according to any of the first to third aspects further comprises triggering an alarm when it is determined that the detection signals are not false signals in any of the first to fifth false signal determination steps.

A fifth aspect of the present invention is concerned with the method according to any of the first to fourth aspects, wherein the detection signals are filtered to remove excessive noise prior to the first to fifth false signal determination steps.

A sixth aspect of the present invention is concerned with the method according to any of the first to fifth aspects, wherein the first to fourth false signal determination steps are carried out in any desired sequence.

A seventh aspect of the present invention is concerned with the method according to any of the first to sixth aspects, wherein, when it is determined that the signals are false signals in any of the first to fourth false signal determination steps, the succeeding step or steps are excluded.

In an eighth aspect of the present invention there is provided a loose part monitoring system for monitoring a loose part in a fluid flow path defined by a wall member, comprising:

a plurality of sensors placed in predetermined positions on the wall member and configured to output a group of detection signals upon detecting information on sound or vibration;

a pattern analyzing section configured to receive the group of detection signals from the plurality of sensors, to obtain a pattern of the order and difference in time of output of the group of detection signals from the plurality of sensors with reference patterns, to compare the acquired pattern with reference pattern data, and to determine whether or not the group of detection signals are false signals;

a waveform rising gradient analyzing section configured to receive the group of detection signals from the plurality of sensors and to exclude the group of detection signals when an impact waveform from a first sensor that has detected a signal first among the plurality of sensors has a smaller rising gradient than that of an impact waveform from a second sensor that detected a signal second among the plurality of sensors;

a damped vibration analyzing section configured to receive the group of detection signals from the plurality of sensors, to obtain a damping time of the waveform of one detection signal selected from the group of detection signals and to determine whether or not the selected detection signal is derived from an impact and thereby to determine whether or not the group of detection signals are false signals; and a frequency spectrum comparing section configured to receive the group of detection signals from the plurality of sensors and to determine whether or not the group of detection signals have generally the same frequency spectrum and thereby to determine whether or not the group of detection signals are false signals.

In a ninth aspect of the present invention, the loose part monitoring system according to the eighth aspect as described above further comprises a specific abnormal sound excluding section configured to receive rising gradients, damping times, and frequency spectra of the detection signals obtained in said waveform rising gradient analyzing section, damped vibration analyzing section and frequency spectrum comparing section, to compare the rising gradients, damping times, and frequency spectra of the group of detection signals obtained in said waveform rising gradient analyzing section, damped vibration analyzing section and frequency spectrum comparing section with those of known detection signals determined as false signals in the past and to determine whether or not there are any detection signals in the group of detection signals that have the same properties as the known detection signals and thereby to determine whether or not the detection signals are false signals.

In a tenth aspect of the present invention, the loose part monitoring system according to any of the eighth and ninth aspects further comprises loose part detectors coupled to the plurality of sensors, respectively, for removing excessive noise from the corresponding detection signals so that the detection signals with relatively less noise are fed to said waveform rising gradient analyzing section, damped vibration analyzing section and frequency spectrum comparing section.

In an eleventh aspect of the present invention, the loose part monitoring system according to any of the eighth to tenth aspects further comprises a detection signal monitoring section coupled to the plurality of sensors, for sensing noise signals from the sensors and optimally adjusting the setting conditions of the loose part detectors.

In an twelfth aspect of the present invention, the loose part monitoring system according to any of the eighth to eleventh aspects further comprises an alarm part coupled to said pattern analyzing section, waveform rising gradient analyzing section, damped vibration analyzing section and frequency spectrum comparing section for triggering an alarm when it is determined that the detection signals are not false signals in any of said pattern analyzing section, waveform rising gradient analyzing section, damped vibration analyzing section and frequency spectrum comparing section.

According to the loose part monitoring method of the first and second aspects of the present invention, it is determined in the first false signal determination step whether or not the group of detection signals from the plurality of sensors are false signal by a method in which a pattern of the order of output of the detection signals and the difference in time of output of the detection signals is compared with known reference pattern data. In the second false signal determination step, it is determined whether the group of detection signals are true or false by a method in which the rising gradient (slope) of the impact waveform of one of the detection signals is compared with that of another one of the detection signals which has been detected later than the one detection signal, that is, based on the change in intensity of sound detected by the sensors in conjunction with the difference in time of output of the detection signals. In the third false signal determination step, it is determined whether the group of detection signals are true or false by a method in which the damping time of the waveform of the detection signals is compared, that is, based on the change in intensity of sound. In the fourth false signal determination step, it is determined whether the group of detection signals are true or false by a method in which the frequency spectra of the detection signals are compared, that is, based on the frequency distribution of sound (pitch).

In the optional fifth false signal determination step, it is comprehensively determined whether the group of detection signals are true or false by a method in which the detection signals that have been determined as being false signals in any of the above second to fourth false signal determination steps are compared with known detection signal data determined as false signals in the past, that is, based on intensity of sound, frequency distribution of sound and optionally loudness of sound (sound pressure).

Therefore, as compared to a conventional configuration in which it is determined whether the detection signals are true or false based primarily on a secondary or derivative physical phenomenon associated with the occurrence of an impact, the accuracy of the determination on whether the detection signals are true or false can be improved significantly and therefore loose part monitoring with very few false alarms and with improved reliability can be achieved.

According to the loose part monitoring system of the eighth aspect of the present invention, it is determined whether the detection signals are false or true by comparing the rising gradient of the impact waveform detect first and the rising gradient of the impact waveform detected second, that is, based on the intensity of sound, in the waveform rising gradient analyzing section. In the damped vibration analyzing section, it is determined whether the detection signals are false or true by comparing the damping time of the waveform the impulsive sound, that is, based on the change in intensity of sound. In the frequency spectrum comparing section, it is determined whether the detection signals are false or true by comparing the frequency spectra from the sensors, that is, based on the frequency distribution of sound (pitch).

In the optional specific abnormal sound excluding section, it is comprehensively determined whether the detection signals are false or true by comparing the detection signals which have been determined as false signals in any of the above sections, with known detection signal data determined as false signals in the past, that is, based on intensity of sound, frequency distribution of sound and loudness of sound (sound pressure).

Therefore, as compared to a conventional configuration in which it is determined whether the detection signals are true or false based primarily on a secondary or derivative physical phenomenon associated with the occurrence of an impact, the accuracy of the determination on whether the detection signals are true or false can be improved significantly and therefore loose part monitoring system with very few false alarms and with improved reliability can be achieved.

According the loose part monitoring system of the eleventh aspect of the present invention, the following unique effect, in addition to the effect described in above, can be achieved. That is, the invention is provided with a detection signal monitoring section for sensing noise signals from the sensors and optimally adjusting the setting conditions of the loose part detectors, signal monitoring in the detection signal monitoring section is performed separately from the signal monitoring by the loose part detectors. Therefore, as compared to a configuration without the detection signal monitoring section, the S/N ratio of the signals that pass the loose part detector and a loose part monitoring system with fewer false alarms can be achieved.

BRIEF DESCRIPTION OF THE DRAWINGS

Other objects, features and advantages of the present invention will become apparent from the detailed description of the preferred embodiments of the invention which follows, when considered in light of the accompanying drawings, in which:

FIG. 6(a) and FIG. 6(b) are views explanatory of a method for acquiring the rising gradient of a waveform, wherein FIG. 6(a) shows an actual impact waveform (AC voltage waveform) and FIG. 6(b) shows a rectified and smoothed secondary impact waveform (DC voltage waveform);

FIG. 7(a) and FIG. 7(b) are views explanatory of damped vibration of an impact waveform wherein FIG. 7(a) shows an actual waveform and FIG. 7(b) shows a rectified and smoothed secondary impact waveform.

DETAILED DESCRIPTION OF THE PREFERRED EMBODIMENTS OF THE INVENTION

Description will be hereinafter made of the invention of this application in detail based on a preferred embodiment thereof.

Figure 1:
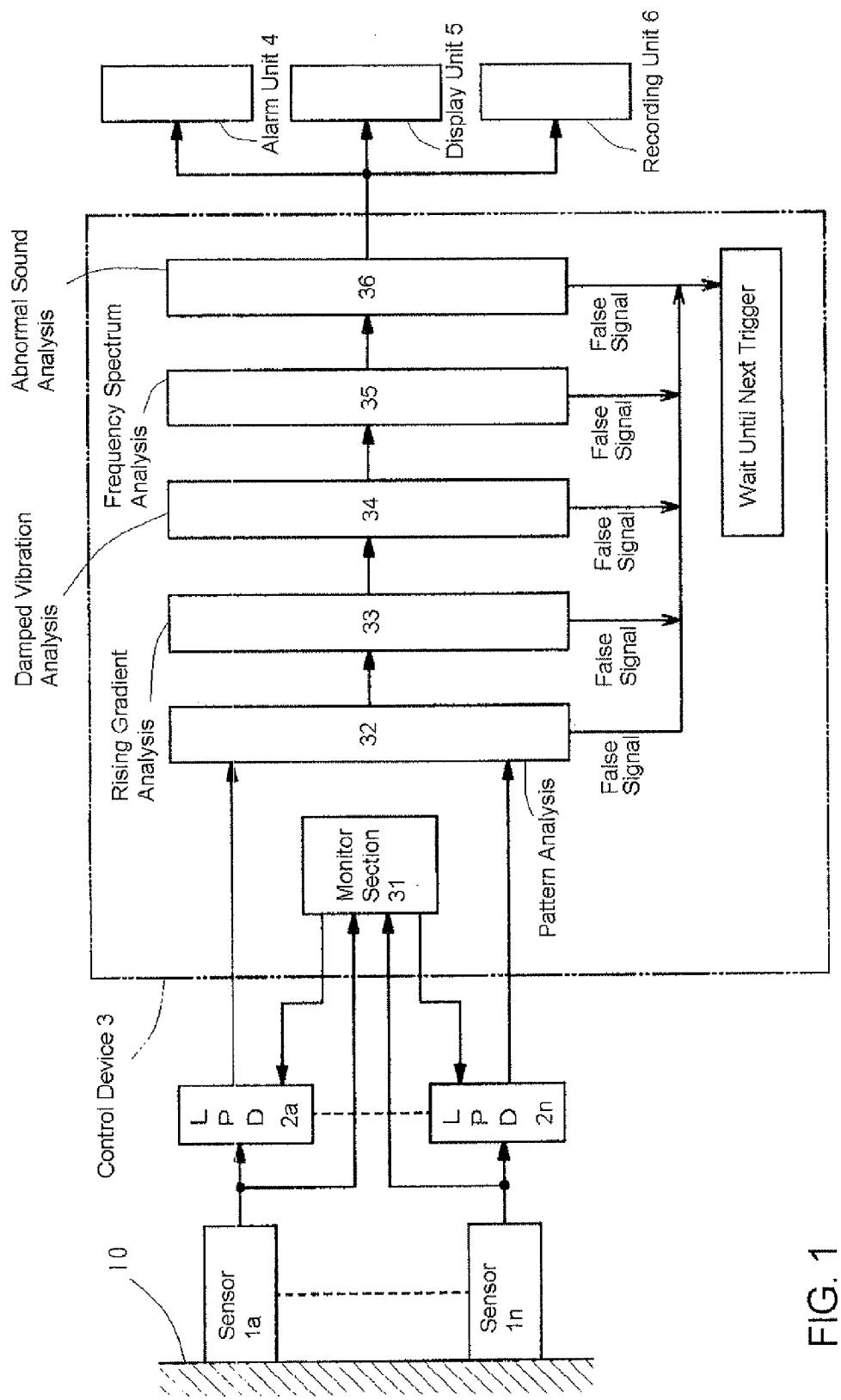
FIG. 1 is a control block diagram of a loose parts monitoring system according to one embodiment of the invention of the present invention.

FIG. 1 shows a control block diagram of a loose part monitoring system for use in a loose part monitoring method according to an embodiment of the invention of this application.

The loose part monitoring system is a system which, when an impact due to a loose part occurs in a fluid flow path of a steam generator or reactor vessel in a nuclear installation, for example, senses the impact and performs necessary monitoring functions such as warning of the presence of the loose part, and is composed of a plurality of sensors $1a$ to $1n$ attached to a wall 10 of the steam generator or the like; a plurality of loose part detectors $2a$ to $2n$ provided corresponding to the sensors $1a$ to $1n$, respectively; a control device 3 for determining the presence or absence of an impact due to a loose part in response to detection signals from the loose part detectors $2a$ to $2n$ and outputting the determination result; an alarm unit 4 for generating a predetermined alarm in response to a determination signal from the control device 3; a display unit 5 for displaying the alarm; and a recording unit 6 for recording the determination result and so on.

The details of the constituent elements, the determination method and so on are described individually below.

I. Sensors $1a$ to $1n$

Figure 2:
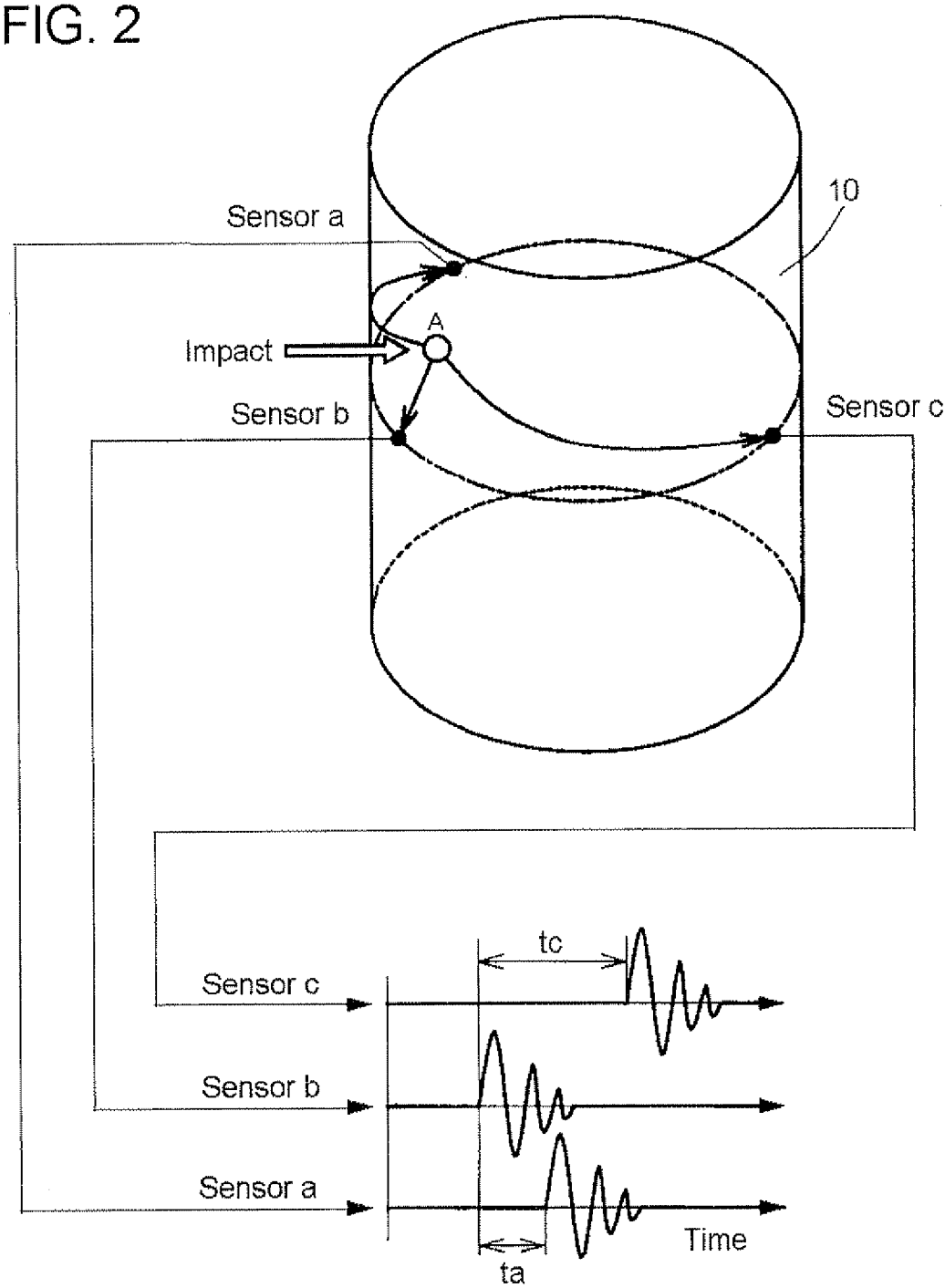
FIG. 2 is a view explanatory of a pattern of vibration detection by a plurality of sensor.

The sensors $1a$ to $1n$ detect the impact of collision of a loose part with the wall 10 as acoustic or impact vibration, and the way of detecting the waveform of the vibration is shown in FIG. 2.

Suppose now that three sensors $1a$ to $1c$ are attached to a wall 10 of a steam generator or the like in a circumferentially spaced relation at predetermined intervals as shown in FIG. 2. When an impact is applied to the wall 10 at a point A, for example, by a loose part with the sensors $1a$ to $1c$ arranged as described above, a vibration waveform is detected first by the sensor $1b$, which is closest to the impact point A, then by the sensor $1a$, which is second closest to the impact point A, and finally by the sensor $1c$, which is farthest from the impact point A, in accordance with the distance from the impact point to the sensors $1a$ to $1c$ on the wall 10. In other words, there are time differences in time of detection of the vibration waveform depending upon the distance from the impact point A. Namely, as shown in FIG. 2, the vibration waveform is detected by the sensor $1a$ with a time difference ta from the time of detection by the sensor $1b$, and by the sensor $1c$ with a time difference tc from the time of detection by the sensor $1b$.

Since the positions where the sensors $1a$ to $1c$ are attached to the wall 10 are known and since the speed at which vibration travels through a metal body is also known, the impact location A on the wall 10 can be identified by calculation.

Therefore, if the pattern of detection of a vibration waveform due to an impact is acquired for each of different impact locations and stored in a database the actual impact location can be easily known, when an impact actually occurs, by comparing the detection pattern acquired on occurrence of the impact (actual detection pattern) with detection patterns stored in advance (stored detection patterns) and extracting a stored detection pattern that is closest to the actual detection pattern.

This means that if there is no stored detection pattern similar to the actual detection pattern, it can be determined that the detected vibration waveform in question is not an impact waveform generated by a collision of a loose part but a vibration waveform derived from, for example, background noise and therefore is a false signal that should be excluded from the monitoring control. This determination method is reflected in the determination in a pattern analyzing section 32 of the control device 3, which will be described later.

II. Loose Part Detectors 2a to 2n

The loose part detectors 2a to 2n, which are preferably provided corresponding to the sensors 1a to 1c, respectively, divide an input signal from corresponding one of the sensors 1a to 1c into a certain number of frequency spectra and pass, only if the signal contains much noise, only frequency bands with relatively low noise to reduce the influence of noise contained in the input signals on the control device 3. The specific configuration and so on of the loose part detectors 2a to 2n are described below based on FIG. 3.

Each of the loose part detectors 2a to 2n is composed of five bandpass filters (which are referred to simply as "BPF-1 to BPF-5" in FIG. 3) which pass different frequency bands.

Figure 3:
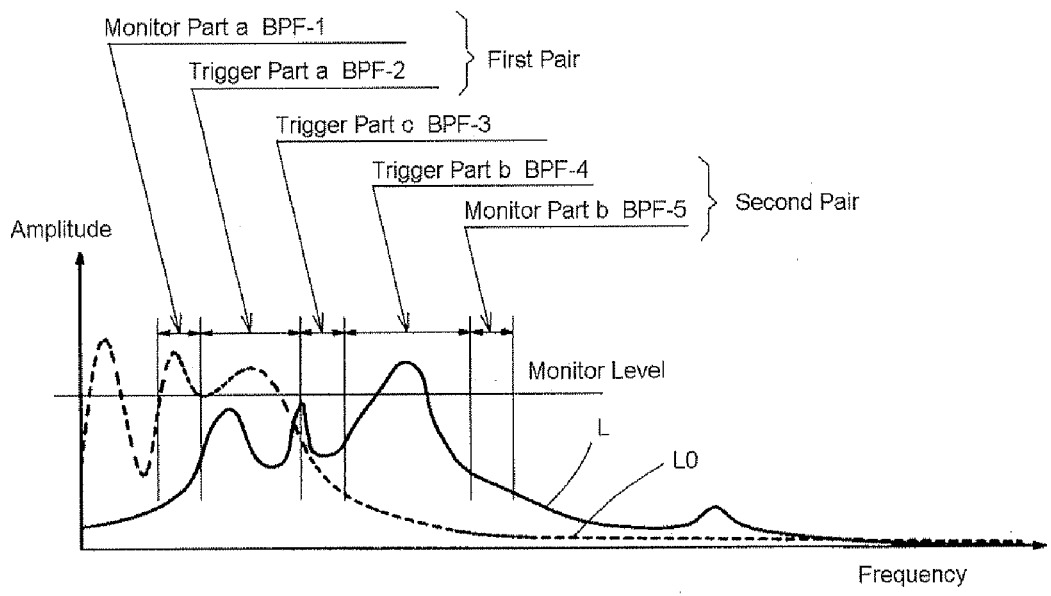
FIG. 3 is a view explanatory of the function of a loose part detector in the loose part monitoring system.

Here, the curve L in FIG. 3 shows an example of a frequency spectrum due to an impact. In general, since vibration due to an impact exhibits deformation patterns (mode shapes) corresponding to the different natural frequencies, the frequency spectrum due to an impact has a plurality of resonance points (peak points). In addition, the natural vibration has different frequencies depending on the material of the loose part, contact or collision conditions and structure (distribution of mass and rigidity). Therefore, the loose part detectors 2a to 2n are required to cover the entire range of the frequency spectrum of an impact so that an impulse can be extracted without fail.

On the other hand, the curve L0 in FIG. 3 shows the frequency spectrum of the background noise due to a swirling stream in the fluid flow path. It is believed that the continuous vibration due to a swirling stream has a frequency spectrum which is different from that of natural vibration due to forced vibration caused by, for example, an impact and which is distributed in a lower frequency band than that of the contact sound of a loose part.

In this embodiment, in view of the above findings, a "first pair" is formed by the bandpass filter "BPF-1," which passes a signal with the lowest frequency band, and the bandpass filter "BPF-2," which passes a signal with a frequency band adjacent to the lowest frequency band, of the five bandpass filters "BPF-1" to "BPF-5," and the low-frequency side bandpass filter "BPF-1" and the high-frequency side bandpass filter "BPF-2" are defined as "monitor part a" and "trigger part a," respectively, in each of the loose part detectors 2a to 2n provided corresponding to the sensors 1a to 1c, respectively.

In addition, a "second pair" is formed by the bandpass filter "BPF-5," which passes a signal with the highest frequency band, and the bandpass filter "BPF-4," which passes a signal with a frequency band adjacent to the highest frequency band, and the low-frequency bandpass filter "BPF-4" and the high-frequency side bandpass filter "BPF-5" are defined as "trigger part b" and "monitor part b," respectively. Moreover, the bandpass filter "BPF-3," which passes a signal with an intermediate frequency band, is defined as "trigger part c."

The "trigger part" and "monitor part" are assigned different detection functions in view of the characteristics of the frequency spectra of impact signals and background noise. The "trigger part" has a function of detecting impact vibration, and the "monitor part" has a function of detecting background noise. The "trigger part" outputs a trigger signal when the level of the detected vibration is equal to or higher than a predetermined level. The "monitor part" constantly monitors the "trigger part," and outputs an error signal when it is determined that the "trigger part" is significantly influenced by noise.

The determination depends on which one of the following determination cases matches the situation.

First Determination Case

When the level of the signal passed through the bandpass filter "BPF-2" is higher than the level of the signal passed through the bandpass filter "BPF-1" and the level of the signal passed through the bandpass filter "BPF-4" is higher than the level of the signal passed through the bandpass filter "BPF-5," it can be believed that both the "trigger part a" and "trigger part b" are not significantly influenced by noise. In this case, therefore, it is determined that the trigger signals from the "trigger part a," "trigger part b" and "trigger part c" are all "valid." This is a "first determination case."

Second Determination Case

When the level of the signal passed through the bandpass filter "BPF-1" is higher than the level of the signal passed through the bandpass filter "BPF-2," the "trigger part a" adjacent to the bandpass filter "BPF-1" may be significantly influenced by noise. In this case, therefore, the trigger signal from the "trigger part a" is determined as "invalid" and the trigger signals from the "trigger part b" and "trigger part c" are determined as "valid." This is a "second determination case," and the example shown in FIG. 3 corresponds to the "second determination case."

Third Determination Case

When the level of the signal passed through the bandpass filter "BPF-5" is higher than the level of the signal passed through the bandpass filter "BPF-4," the "trigger part b" adjacent to the bandpass filter "BPF-5" may be significantly influenced by noise. In this case, therefore, the trigger signal from the "trigger part b" is determined as "invalid" and the trigger signals from the "trigger part a" and the "trigger part c" are determined as "valid." This is a "third determination case."

Fourth Determination Case

When the level of the signal passed through the bandpass filter "BPF-1" is higher than the level of the signal passed through the bandpass filter "BPF-2" and the level of the signal passed through the bandpass filter "BPF-5" is higher than the level of the signal passed through the bandpass filter "BPF-4," both the "trigger part a" and "trigger part b" may be significantly influenced by noise. In this case, therefore, the trigger signals from the "trigger part a" and "trigger part b" are determine as "invalid" and only the trigger signal from the "trigger part c" is determined as "valid." This is a "fourth determination case."

The determination is made based on the determination cases as described above, and the signals from the trigger parts determined as "valid" are combined and output as one trigger signal to the control device 3, which is next described. The detection signal from the trigger parts determined as "invalid" are excluded as false signals from the subsequent control.

III. Control Device 3

The control device 3 is composed, as shown in FIG. 1, of a detection signal monitoring section 31, a pattern analyzing section 32, a waveform rising gradient analyzing section 33, a damped vibration analyzing section 34, a frequency spectrum comparing section 35, and an optional specific abnormal sound excluding section 36.

III-1. Detection Signal Monitoring Section 31

The detection signal monitoring section 31 receives a group of detection signals from the plurality of sensors 1a to 1n at regular intervals and monitors the detection signals, and consistently maintains the accuracy of the trigger signals optimally by controlling various adjustment functions of each of the loose part detectors 2a to 2n based on the information carried by the signals.

It has been confirmed that the background noise detected by a sensor attached to a wall of a steam generator or the like has a peculiar frequency spectrum which hardly changes over time.

Figure 4:
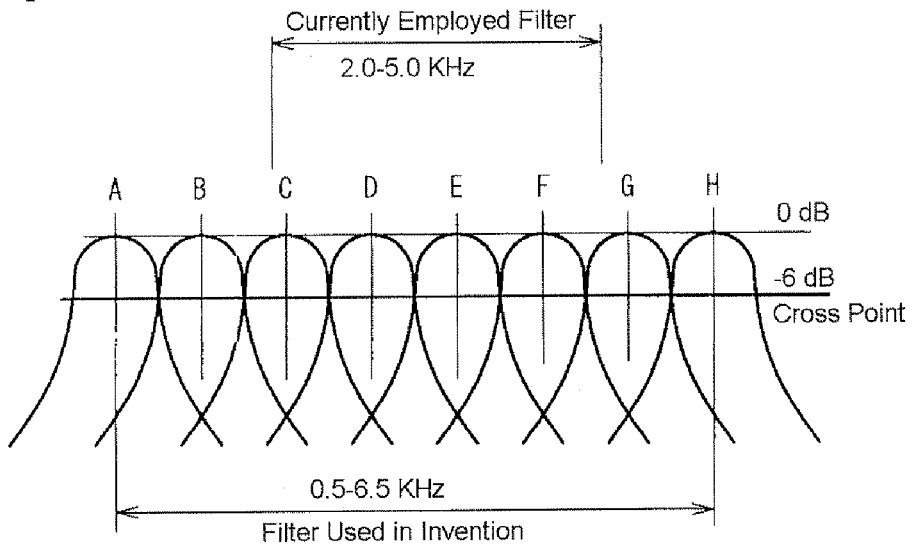
FIG. 4 is a view explanatory of the function of bandpass filters in a detection signal monitoring section.

Thus, each of the loose part detectors 2a to 2n divides the detection signal from corresponding one of the sensors 1a to 1c into eight parts according to the frequency spectrum as shown in FIG. 4 and relates the bandpass filters "BPF-A" to "BPF-H" to each divided parts. The center frequencies of the signals which pass the bandpass filters "BPF-A" to "BPF-H" are set to a value between "0.50" to "6.52" as shown in Table 1 below. Thus, information on the frequency band of the background noise divided into eight parts can be obtained by calculating the average, per minute, of each of the detection signals that have passed the bandpass filters "BPF-A" to "BPF-H.

TABLE 1

| Filter | Center frequency (f0) KHz |
| --- | --- |
| BPF-A | 0.50 |
| BPF-B | 1.36 |
| BPF-C | 2.22 |
| BPF-D | 3.08 |
| BPF-E | 3.94 |
| BPF-F | 4.80 |
| BPF-G | 5.66 |
| BPF-H | 6.52 |

In the above frequency band information of the background noise, the frequency bands in which a higher signal level than those detected in other frequency bands is detected are considered to be influenced more significantly by background noise than other bands. Therefore, a trigger signal in such a band is determined as "invalid". The detection signals determined as "valid" as trigger signals are combined and output as one trigger signal to the control device 3. The center frequencies and passbands of the bandpass filters, and the number of bands of a trigger signal which may be determined as "invalid" are preferably optimized based on the specified conditions of the nuclear installation or the like as a monitoring object in order not to miss an impact.

As described above, the detection signal monitoring section 31 averages the detection signals by calculation and determines the bands of trigger signals that should be determined as "invalid" to control the loose part detectors 2a to 2n consistently. The signal monitoring in the detection signal monitoring section 31, which is optional in the present invention, may be performed separately from the signal monitoring in the loose part detectors 2a to 2n described before, and the S/N ratio of the signals that pass the loose part detector 2a to 2n is further improved as compared to the configuration without the detection signal monitoring section 31.

The method of reducing noise using the five bandpass filters "BPF-1 to BPF-5" of the loose part detectors 2a to 2n as described above is a method which is preferably applicable to background noise having a frequency spectrum distributed in a lower frequency range than the contact sound of a loose part. However, when the background noise does not satisfy the condition, a control method using the detection signal monitoring section 31 is effective.

III-2: Pattern Analyzing Section 32

The pattern analyzing section 32 analyses the signals that have passed the loose part detectors 2a to 2n and determines whether the signals are true or false using the method for determining the vibration waveform pattern described above. As described before, (a) since, when a plurality of sensors 1a to 1n attached to the wall 10 at different positions detect impacts from a single source, they should detect the impacts in the order of increasing distance from the impact source, and (b) since the upper limit of the detection time difference can be determined based on the positions where the sensors 1a to 1n are attached to the wall 10 and the speed at which sound travels through steel, when the order of detection by the sensors 1a to 1n and the detection time differences between the sensors 1a to 1n are unrealistic, the signals are determined as false signals caused by noise and excluded from the subsequent control. This determination can reduce the generation of a false alarm due to false signals.

Specifically, the correspondence relationship between the combination of the channel which detects a signal first and the channel which detects a signal second (which are herein defined as "CH-A" and "CH-B" but their detection order is not specified) among the sensors 1a to 1n and the maximum delay in the detection time between the channels is previously acquired as an event table as shown in Table 2. It should be noted that the event table in the case where four sensors are provided is shown here as an example, in which case there are six possible combinations of channels.

TABLE 2

| CH-A | CH-B | Maximum delay (msec) |
| --- | --- | --- |
| 1 | 2 | 5 |
| 1 | 3 | 8 |
| 1 | 4 | 10 |
| 2 | 3 | 10 |
| 2 | 4 | 8 |
| 3 | 4 | 5 |

Then, when signals are actually detected by the sensors 1a to 1n, it is determined whether or not the pattern of the detection order and detection time difference of the signals matches any of the plurality of patterns recorded on the above event table. Then, when the pattern matches any of the recorded patterns, the detection signals are determined as true signals caused by an impact and are output to the waveform rising gradient analyzing section 33, which is next described. On the contrary, when the pattern does not match any of the recorded patterns, the detection signals are determined as false signals caused by noise such as swirling stream sound and excluded from the subsequent control.

III-3: Waveform Rising Gradient Analyzing Section 33

The waveform rising gradient analyzing section 33 analyses the rising gradients of the impact waveforms and determines whether the signals are true or false to exclude false signals from the subsequent control. In other words, the waveform rising gradient analyzing section 33 determines whether the detection signals are true or false by comparison of "change in intensity of sound". This is described below in detail.

Figure 5:
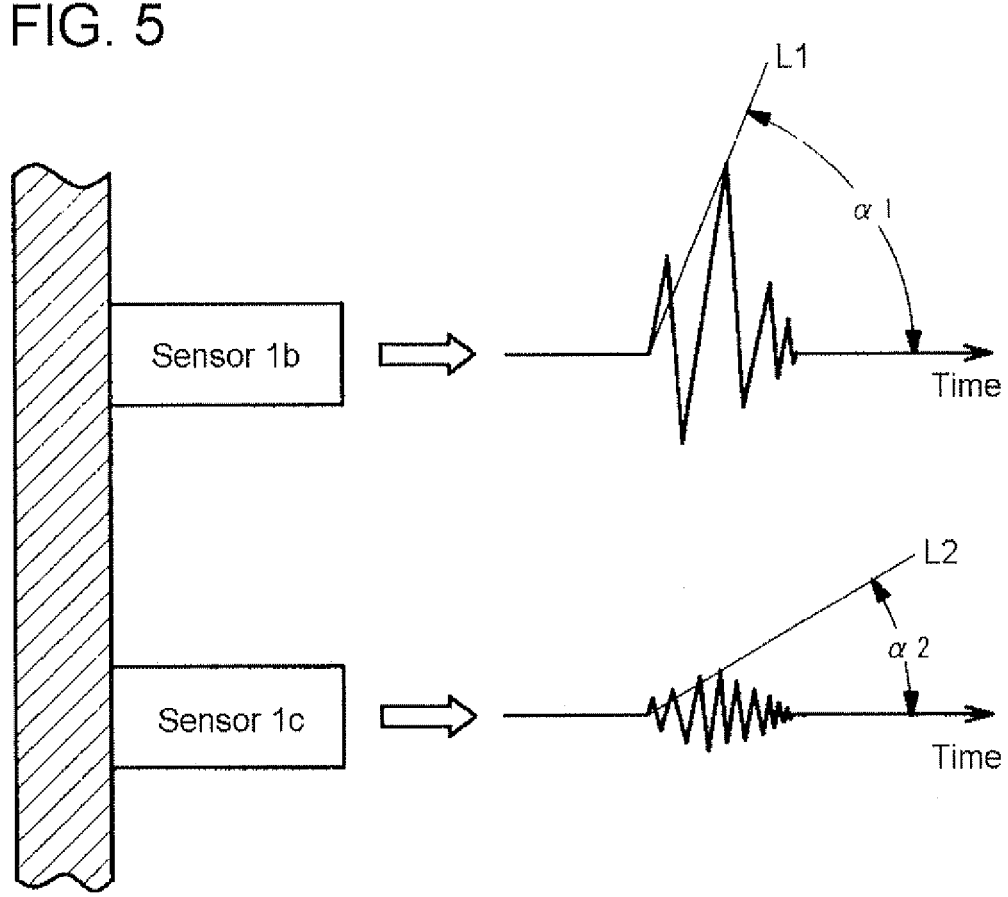
FIG. 5 is a view explanatory of waveform rising gradients.

An impact waveform is characterized in that the waveform detected by a sensor (for example, sensor 1b in FIG. 5) close to the impact point rises sharply (see angle α1 in the upper part of FIG. 5) and the waveform detected by a sensor (for example, sensor 1c in FIG. 5) far from the impact point rises gently (see angle α2 in the lower part of FIG. 5). Therefore, when the above relation is not satisfied between sensors located at different distances from the impact point, the signals can be determined as false signals caused by noise and the S/N ratio in the subsequent control can be improved by excluding the false signals from the subsequent control.

Figure 6A:
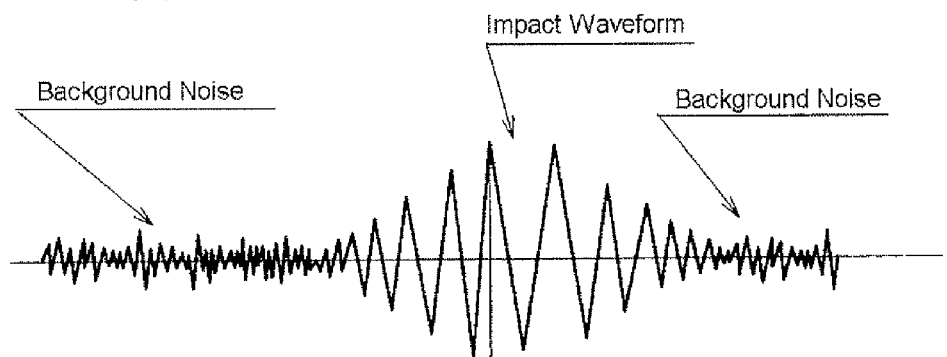

To obtain the gradient of a waveform (the inclination of the straight line L1 or L2 in FIG. 5), it is necessary to obtain the time difference and amplitude difference between the "base point" of the amplitude where the impact starts and the "peak point." In reality, however, the "bases" of impact waveforms are ambiguous because of background noise. Thus, in this embodiment, as shown in FIG. 6(a) and FIG. 6(b), the actual impact waveform (AC voltage waveform, see FIG. 6(a)) is subjected to full-wave rectification and integration to obtain a rectified and smoothed secondary impact waveform (DC voltage waveform, see FIG. 6(b)) and the "base point" and "base voltage," and "peak point" and "peak voltage" are obtained based on the secondary impact waveform by the following procedures.

Figure 6B:
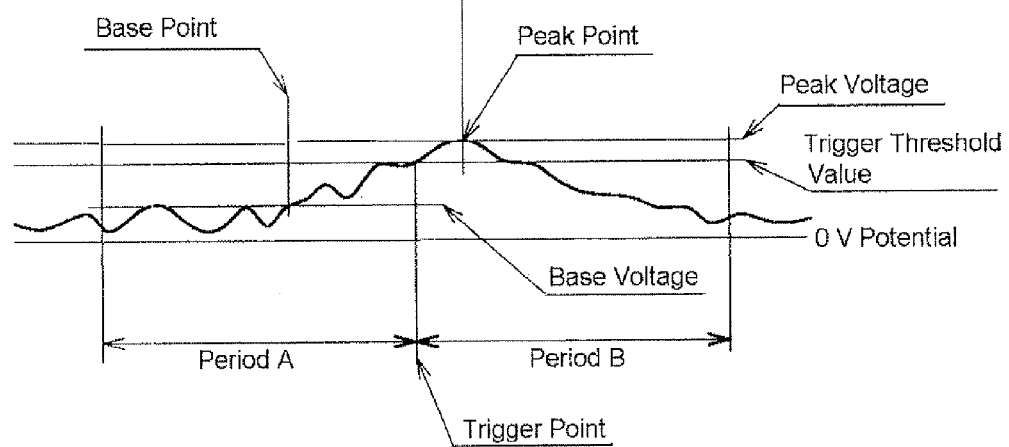

First, in the secondary impact waveform as shown in FIG. 6(b), the average value over a period A prior to a trigger point corresponding to a "trigger threshold value" is obtained and defined as "base voltage." Then, the area within the period A is sequentially scanned from the trigger point to find a point corresponding to the "base voltage" and the point is defined as "base point."

Then, the point where the voltage is the highest is found in a period B following the trigger point, and the voltage at the point and the point are defined as "peak voltage" and "peak point," respectively.

The "base point" and "base voltage," and "peak point" and "peak voltage" obtained as described above are substituted into the following equation to obtain the rising gradient of the waveform:

Rising gradient(rate of change)=(peak voltage−base voltage)/(peak point−base point).

III-4. Damped Vibration Analyzing Section 34

The damped vibration analyzing section 34 analyses the damped vibration of the detected waveform and determines whether the signals are true or false based on the damping time thereof to exclude false signals from the subsequent control. In other words, the damped vibration analyzing section 34, as in the case with the waveform rising gradient analyzing section 33 described above, determines whether the detection signals are true or false by comparison of "change in intensity". The difference between the waveform rising gradient analyzing section 33 and the damped vibration analyzing section 34 is that the waveform rising gradient analyzing section 33 treats the "change in intensity of sound" in terms of the rising gradient of the waveform, whereas the damped vibration analyzing section 34 treats the "change in intensity of sound" in terms of the damping time of the waveform. This is described below in detail.

It is known that vibration caused by an impact shows a steep rise and then damps exponentially since it is damped by the effect of resistances such as friction heat when the energy of the vibration is diffused in all directions from the impact point. Therefore, in this embodiment, it is determined whether or not the signals are caused by an impact by examining the damping characteristics of at least one of the detection signals from the sensors. The detection signals which have been determined as not being ascribed to an impact are excluded as false signals from the subsequent control.

The damped vibration determination method is described with reference to FIG. 7(a) and FIG. 7(b). First, the signal obtained from the sensor closest to the impact point (that is, the channel in which a trigger is generated first) among the sensors that have detected a signal is selected.

Figure 7A:
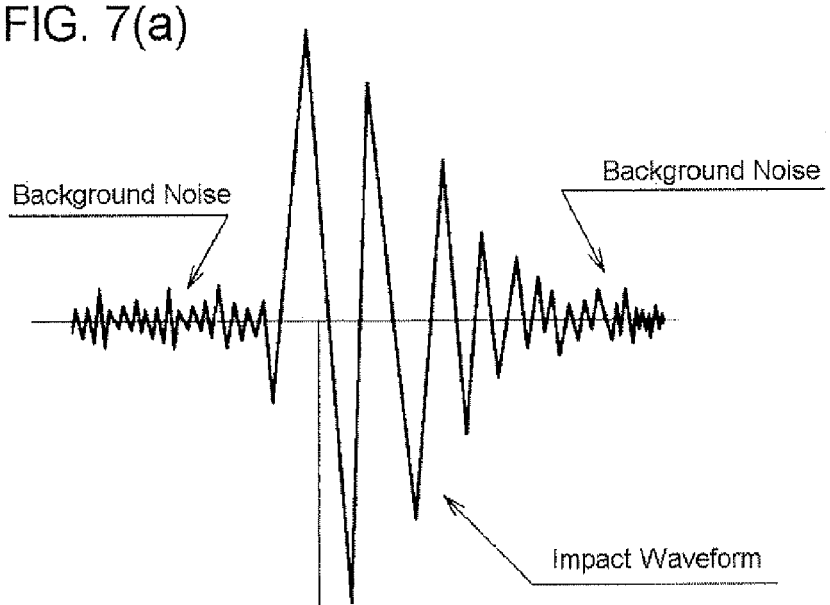
Figure 7B:
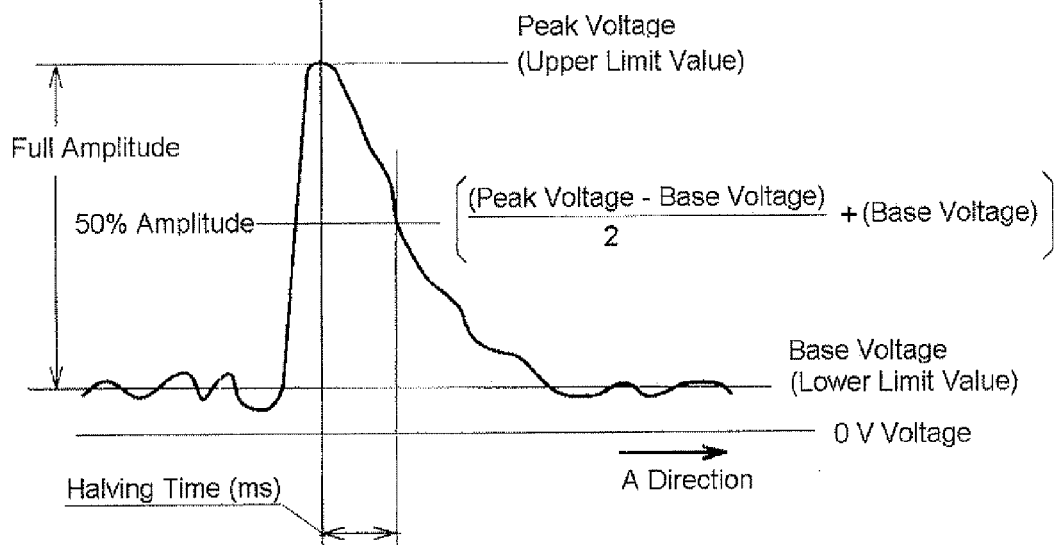
Figure 8A:
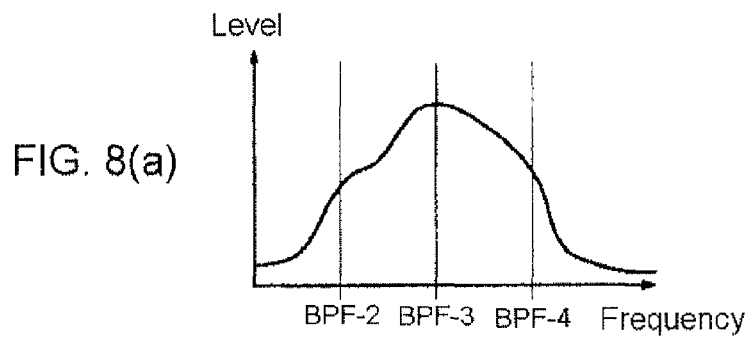
FIG. 8(a) and FIG. 8(d) are pattern diagrams of a frequency spectrum.
Figure 8B:
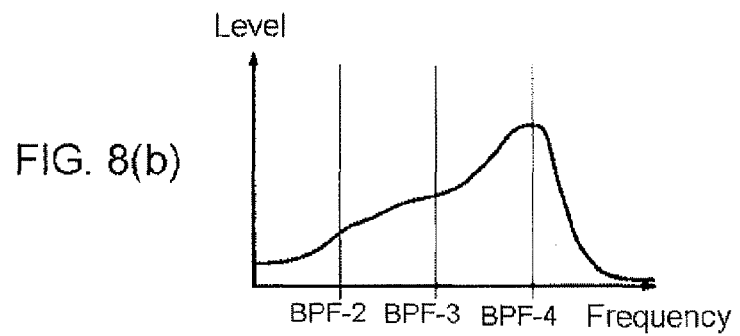
Figure 8C:
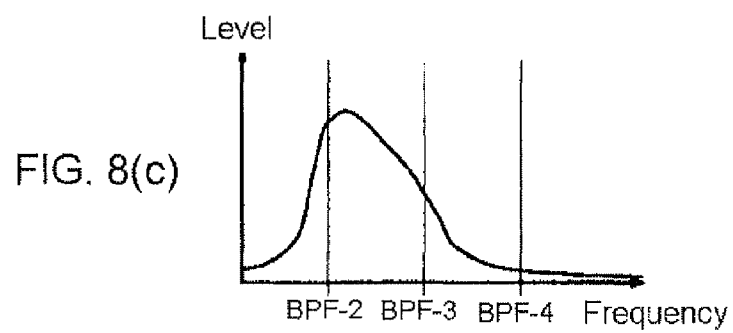
Figure 8D:
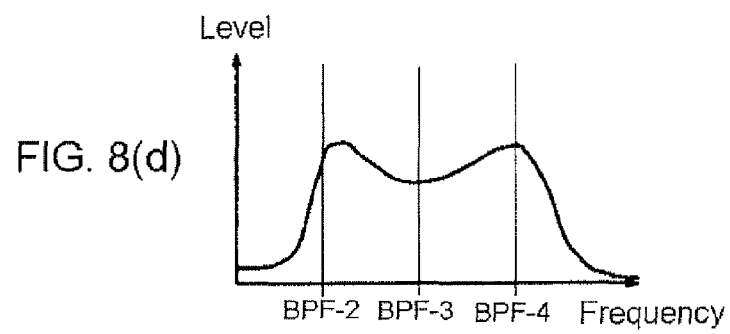

The waveform of the signal selected is shown in FIG. 7(a) and FIG. 7(b). Here, full-wave rectification and integration are applied to the actual waveform shown in FIG. 7(a) by applying the method used in the waveform rising gradient analyzing section 33 to the determination of the damped vibration to obtain a secondary impact waveform as shown in FIG. 7(b).

Then, the "base voltage" and "peak voltage" of the secondary impact waveform are defined as "lower limit value" and "upper limit value" of the impact waveform. The difference between "base voltage" and "peak voltage" represents a full amplitude (Full amplitude="Peak voltage"−"Base voltage").

In addition, sequential scanning is carried out in the direction A of the drawing from the "upper limit value" to obtain the period of time it takes for the amplitude to reach 50%, which is defined as "halving time".

There is the following relation between the energy of an impact and its damping: more energy is ejected and the damping rate increases as the energy of impact is greater. In view of this relation, it is believed that the halving time of damped vibration is not significantly changed depending on the amount of impact energy.

In view of the foregoing, when the halving time of the vibration waveform detected by a sensor falls outside the range previously expected as the halving time of an impact waveform, it is determined that the vibration waveforms are not impact waveforms but false signals caused by noise and excluded from the subsequent control.

III-5: Frequency Spectrum Comparing Section 35

The frequency spectrum comparing section 35 obtains the frequency spectra of the vibration waveforms detected by the sensors of the sensor group and compares the frequency spectra. Then, when the frequency spectra from the sensors are not generally the same, the frequency spectrum comparing section 35 determines that the vibration signals detected by the sensors are false signals and excludes the signals from the subsequent control. In other words, the frequency spectrum comparing section 35 determines whether the detection signals are true or false by comparison of "frequency distributions". This is described below in detail.

This is a false signal determination method based on the finding that, since exactly the same frequencies are detected when a signal transmitted through a medium is detected by a plurality of sensors located at different positions, the frequency spectra of the signals detected by a plurality of sensor located at different positions are not significantly different if the signals are originated from a single impact.

The frequency spectrum comparing method is described below in detail. In comparing frequency spectra, the signals divided into frequency bands in the loose part detectors 2a to 2n as described before are used. The divided signals are three types of signals as shown in FIG. 3; namely, low-frequency range signal acquired by the "trigger part a", intermediate-frequency range signal acquired by the "trigger part c", and high-frequency range signal acquired by the "trigger part b".

The divided three types of signals are compared with respect to the intermediate-frequency range signal in a comparator, and a binary signal "H" or "L" is output based on the result of comparison as described in the following (a) or (b).

(a) As a result of comparison, when the signal level of the low-frequency range signal is higher than that of the intermediate-frequency range signal, an "H" signal is output and, when the signal level of the low-frequency range signal is lower than that of the intermediate-frequency range signal, an "L" signal is output.

(b) As a result of comparison, when the signal level of the high-frequency range signal is higher than that of the intermediate-frequency range signal, an "H" signal is output and, when the signal level of the high-frequency range signal is lower than that of the intermediate-frequency range signal, an "L" signal is output.

The binary signals obtained here are recognized as frequency spectrum that has one of four pattern shapes as shown in FIGS. 8(a) to 8(d) in the frequency spectrum comparing section 35, and the frequency spectrum is compared with a frequency spectrum obtained from another sensor in the sensor group. Specifically, the channel that detected abnormal sound first and the channel that detected abnormal sound second are selected as objects of evaluation, and, when the pattern shapes of the frequency spectra from the two channels are not consistent with each other, the signals are determined as false signals and excluded from the subsequent control.

III-6: Specific Abnormal Sound Excluding Section 36

The specific abnormal sound excluding section 36 memorizes records of the tone and detection channel of the detection signal determined by the user as a false alarm in the past. When a newly detected signal has the same properties as signals of the records, the signal is regarded as a false signal. In other words, the specific abnormal sound excluding section 36 comprehensively determines whether detection signals are true or false using characteristics of detection signals that have been once confirmed as the tone of an impulsive sound.

Here, since the tone of a detection signal determined by the frequency distribution (frequency spectrum), change in intensity (rising gradient and damping time) and additionally preferably loudness (amplitude), a specific tone table as shown in Table 3 below is created.

The channel that detected abnormal sound first and the channel that detected abnormal sound second are added to the specific tone table as detection channels. Then, the frequency distribution (one of the four-pattern waveforms acquired in the frequency spectrum comparing section 35 described above), the change in intensity of the sound (the rising gradient acquired by the waveform rising gradient analyzing section 33 described before and the damping time acquired by the damped vibration analyzing section 34 described before), and the loudness of the sound (the full amplitude acquired in the waveform rising gradient analyzing section 33 or the damped vibration analyzing section 34 described before) are recorded for each of the detection channels.

TABLE 3

| Item | Detected channel number | Frequency 4 patterns | Envelope | | |
|---|---|---|---|---|---|
| | | | Rising gradient | Damping time | Amplitude |
| 1 | 1 (abnormal sound is detected first) | 2 | 86 V/sec | 1.8 ms | 0.6 grms |
| 2 | 2 (abnormal sound is detected second) | | 32 V/sec | 1.3 ms | 0.1 grms |

In evaluation, a predetermined error is set to each of the above parameters. When all the parameters of an abnormal sound with a specific tone is found to coincide with the recorded parameters within the set errors, then the detection signals of the abnormal sound are determined as false signals and excluded from the subsequent control.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A method for monitoring a loose part in a fluid flow path using a plurality of sensors which are placed in predetermined positions on a wall defining the fluid flow path for detecting information on sound or vibration, said plurality of sensors being configured to output a group of detection signals upon detection of the information, said method comprising:
a first false signal determination step comprising comparing a pattern of the order and difference in time of output of the group of detection signals from the plurality of sensors with reference patterns to determine whether or not the group of signals are false signals;
a second false signal determination step comprising comparing a rising gradient of one detection signal which is selected from the group of detection signals and which has been output early with that of another detection signal which is selected from the group of detection signals and which has been output late to determine whether or not the group of signals are false signals;
a third false signal determination step comprising obtaining a damping time of the waveform of one detection signal which is selected from the group of detection signals and determining whether or not the selected detection signal is derived from an impact and thereby determining whether or not the group of signals are false signals;
a fourth false signal determination step comprising comparing the frequency spectra of the group of detection signals to determine whether or not the group of signals are false signals; and
a fifth false signal determination step comprising comparing the rising gradients, damping times, and frequency spectra of the group of detection signals obtained in the second to fourth false signal determination steps with those of known detection signals determined as false signals in the past, and determining whether or not there are any detection signals in the group of detection signals that have the same properties as the known detection signals, thereby to determine whether or not the group of signals are false signals.

2. The method according to claim 1, further comprising triggering an alarm when it is determined that the group of detection signals are not false signals in any of the first to fifth false signal determination steps.

3. The method according to claim 1, wherein the group of detection signals are filtered to remove excessive noise prior to the first to fifth false signal determination steps.

4. The method according to claim 1, wherein the first to fourth false signal determination steps are carried out in any desired sequence.

5. The method according to claim 4, wherein, when it is determined that the group of detection signals are false signals in any of the first to fourth false signal determination steps, the succeeding step or steps are excluded.

6. A method for monitoring a loose part in a fluid flow path defined by a wall member using a plurality of sensors which are placed in predetermined positions on the wall member and which are configured to output detection signals upon detecting information on sound or vibration, comprising:
a first false signal determination step comprising receiving the detection signals from the plurality of sensors, acquiring a pattern of the order in which selected two of the detection signals have been output and the difference in time of output between the selected two detection signals, and comparing the acquired pattern with reference pattern records to determine whether or not the detection signals are false signals;

a second false signal determination step comprising receiving the detection signals from the plurality of sensors, acquiring a first rising gradient of first one of the detection signals, acquiring a second rising gradient of second one of the detection signals that arrives later than the first one, and comparing the first and second rising gradients to determine whether or not the detection signals are false signals;

a third false signal determination step comprising receiving the detection signals from the plurality of sensors, obtaining a damping time of selected one of the detection signals, and determining whether or not the obtained damping time falls within a predetermined range and thereby to determine whether or not the detection signals are false signals; and a fourth false signal determination step comprising receiving the detection signals from the plurality of sensors, obtaining frequency spectra of at least two of the detection signals, and determining whether or not the obtained frequency spectra of the at least two detection signals match with each other and thereby to determine whether or not the detection signals are false signals.

7. The method according to claim 6, further comprising a fifth false signal determination step comprising comparing the rising gradients, the damping times, the frequency spectra and optionally amplitudes of the detection signals obtained in the second to fourth false signal determination steps with those of detection signals determined as false signals in the past to determine whether or not the detection signals are false signals.

8. The method according to claim 6, further comprising triggering an alarm when it is determined that the detection signals are not false signals in any of the first to fourth false signal determination steps.

9. The method according to claim 7, further comprising triggering an alarm when it is determined that the detection signals are not false signals in any of the first to fifth false signal determination steps.

10. The method according to claim 6, wherein the detection signals are filtered to remove excessive noise prior to the first to fifth false signal determination steps.

11. The method according to claim 6, wherein the first to fourth false signal determination steps are carried out in any desired sequence.

12. The method according to claim 11, wherein, when it is determined that the signals are false signals in any of the first to fourth false signal determination steps, the succeeding step or steps are excluded.

13. A loose part monitoring system for monitoring a loose part in a fluid flow path defined by a wall member, comprising:

a plurality of sensors placed in predetermined positions on the wall member and configured to output a group of detection signals upon detecting information on sound or vibration;

a pattern analyzing section configured to receive the group of detection signals from the plurality of sensors, to obtain a pattern of the order and difference in time of output of the group of detection signals from the plurality of sensors with reference patterns, to compare the acquired pattern with reference pattern data, and to determine whether or not the group of detection signals are false signals;

a waveform rising gradient analyzing section configured to receive the group of detection signals from the plurality of sensors and to exclude the group of detection signals when an impact waveform from a first sensor that has detected a signal first among the plurality of sensors has a smaller rising gradient than that of an impact waveform from a second sensor that detected a signal second among the plurality of sensors;

a damped vibration analyzing section configured to receive the group of detection signals from the plurality of sensors, to obtain a damping time of the waveform of one detection signal selected from the group of detection signals and to determine whether or not the selected detection signal is derived from an impact and thereby to determine whether or not the group of detection signals are false signals; and a frequency spectrum comparing section configured to receive the group of detection signals from the plurality of sensors and to determine whether or not the group of detection signals have generally the same frequency spectrum and thereby to determine whether or not the group of detection signals are false signals.

14. The loose part monitoring system according to claim 13, further comprising a specific abnormal sound excluding section configured to receive rising gradients, damping times, and frequency spectra of the detection signals obtained in said waveform rising gradient analyzing section, damped vibration analyzing section and frequency spectrum comparing section, to compare the rising gradients, damping times, and frequency spectra of the group of detection signals obtained in said waveform rising gradient analyzing section, damped vibration analyzing section and frequency spectrum comparing section with those of known detection signals determined as false signals in the past and to determine whether or not there are any detection signals in the group of detection signals that have the same properties as the known detection signals and thereby to determine whether or not the detection signals are false signals.

15. The loose part monitoring system according to claim 13, further comprising loose part detectors coupled to the plurality of sensors, respectively, for removing excessive noise from the corresponding detection signals so that the detection signals with relatively less noise are fed to said waveform rising gradient analyzing section, damped vibration analyzing section and frequency spectrum comparing section.

16. The loose part monitoring system according to claim 15, further comprising a detection signal monitoring section coupled to the plurality of sensors for sensing noise signals from the sensors and optimally adjusting the setting conditions of the loose part detectors.

17. The loose part monitoring system according to claim 13, further comprising an alarm part coupled to said pattern analyzing section, waveform rising gradient analyzing section, damped vibration analyzing section and frequency spectrum comparing section for triggering an alarm when it is determined that the detection signals are not false signals in any of said pattern analyzing section, waveform rising gradient analyzing section, damped vibration analyzing section and frequency spectrum comparing section.

* * * * *